United States Patent [19]

Smith

[11] Patent Number: 4,741,389

[45] Date of Patent: May 3, 1988

[54] CLOSED LOOP ENERGY EXCHANGE SYSTEM

[76] Inventor: James R. Smith, 12642 Perkins Rd., Baton Rouge, La. 70810

[21] Appl. No.: 737,276

[22] Filed: May 23, 1985

[51] Int. Cl.⁴ .................. F25D 23/00; F25B 27/02
[52] U.S. Cl. .................................. 165/45; 62/260; 417/371; 165/48.1
[58] Field of Search ............... 237/2 B; 62/238.6, 260, 62/324.1; 165/45, 48 R; 126/400; 417/371

[56] References Cited

U.S. PATENT DOCUMENTS

| | | | |
|---|---|---|---|
| 3,399,624 | 9/1968 | Echard et al. | 417/371 |
| 3,667,870 | 6/1972 | Yoshida et al. | 417/371 |
| 4,375,831 | 3/1983 | Downing et al. | 237/2 B X |
| 4,448,237 | 5/1984 | Riley | 165/45 X |

Primary Examiner—Henry A. Bennet
Attorney, Agent, or Firm—William David Kiesel; Robert C. Tucker; Timothy J. Monahan

[57] ABSTRACT

A closed loop energy exchange system is disclosed configured to utilize a pump assembly comprising a submersible pump positioned in casing having an inlet means to receive water or similar fluid in a manner to create a turbulent flow of water within the casing.

3 Claims, 2 Drawing Sheets

CLOSED LOOP ENERGY EXCHANGE SYSTEM

BACKGROUND OF THE INVENTION

1. Field of Invention

This invention relates broadly to closed loop energy exchange systems and more particularly to a closed loop system configured to utilize submersible pumps.

2. Prior Art

Closed loop energy exchange systems such as seen in FIG. 1 have been known wherein water or water/antifreeze solutions are circulated in plastic pipes underground and through various heat exchange devices, such as water source heat pump, to take energy advantage of the difference between the surface temperature and the relative constant underground earth temperature.

However, in the operation of such systems, conventional centrifugal pumps have been employed. Unfortunately, these pumps are either noisy, or not as efficient, nor have as long a life as is desired.

SUMMARY OF THE INVENTION

Therefore, it is an object of this invention to provide a closed loop energy exchange system which utilizes a more efficient, longer lasting, quieter pump assembly.

These and other objects and advantages of this invention shall become apparent from the ensuing description of the invention.

Accordingly, a closed loop energy exchange system is provided comprising a first length of tubing positioned in the earth and connected at one end to a heat exchange means and connected at its opposite ends to the inlet connection of the sealed submersible pump assembly, and a second length of tubing connected at one end to the outlet connection of the sealed submersible pump assembly and the other end operatively connected to the heat exchange means to allow flow of fluid through the second length to the first length of tubing.

PREFERRED EMBODIMENTS OF THE INVENTION

Figure 1:
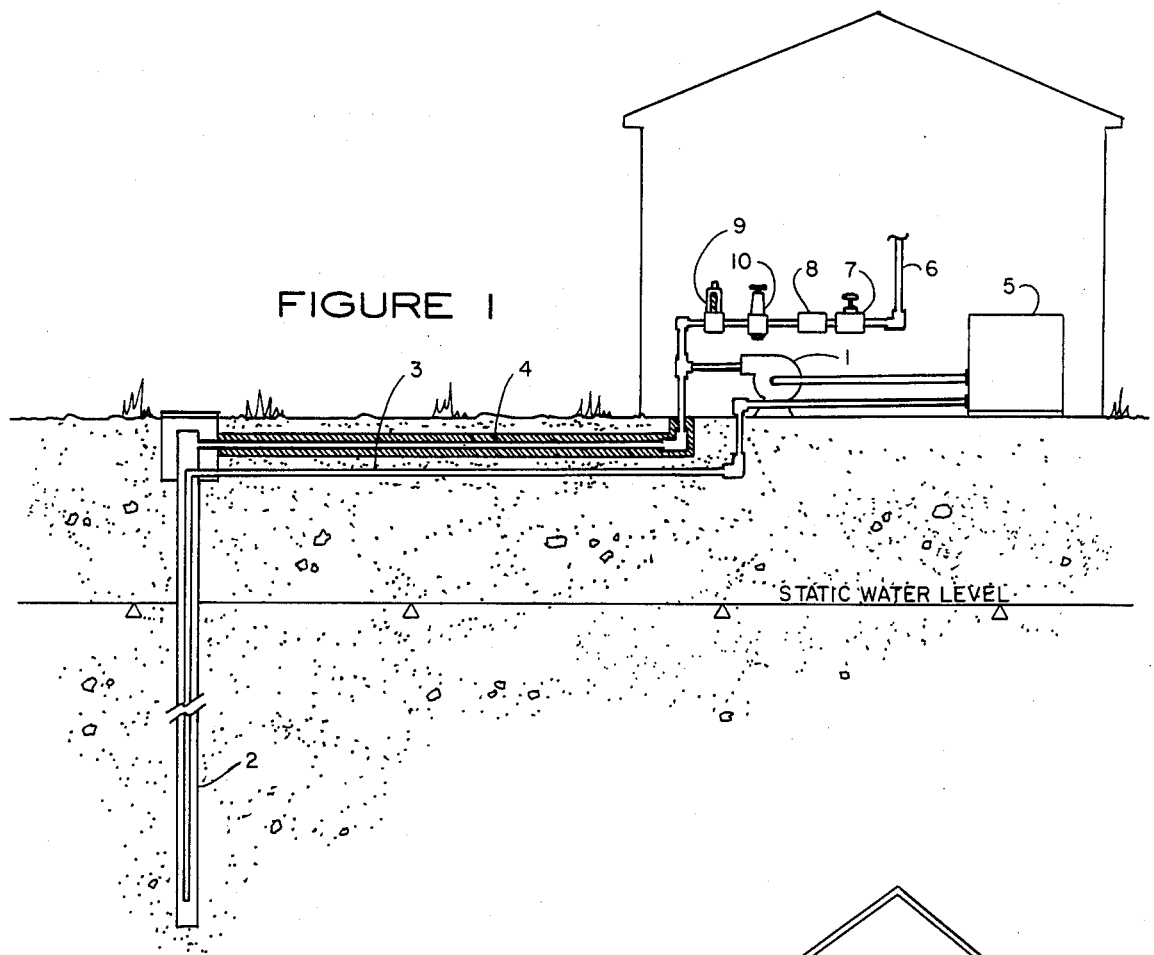
FIG. 1 is a schematic illustrating a present day heat exchange system which utilizes the constant temperature of the subsoil to obtain energy savings.

FIG. 1 schematically depicts the present state-of-the-art vertical closed loop energy saving systems wherein water or similar media is circulated by centrifugal pump in a closed loop system consisting of casing 2, pipe 3, insulated pipe 4 and a heat pump 5 or other heat exchange means. In this system, water is supplied to the system through water line 6 the quantity of which is controlled by valve 7 and wherein the pressure is controlled by a conventional series of check valve 8, relief valve 9 and regulator 10.

Figure 2:
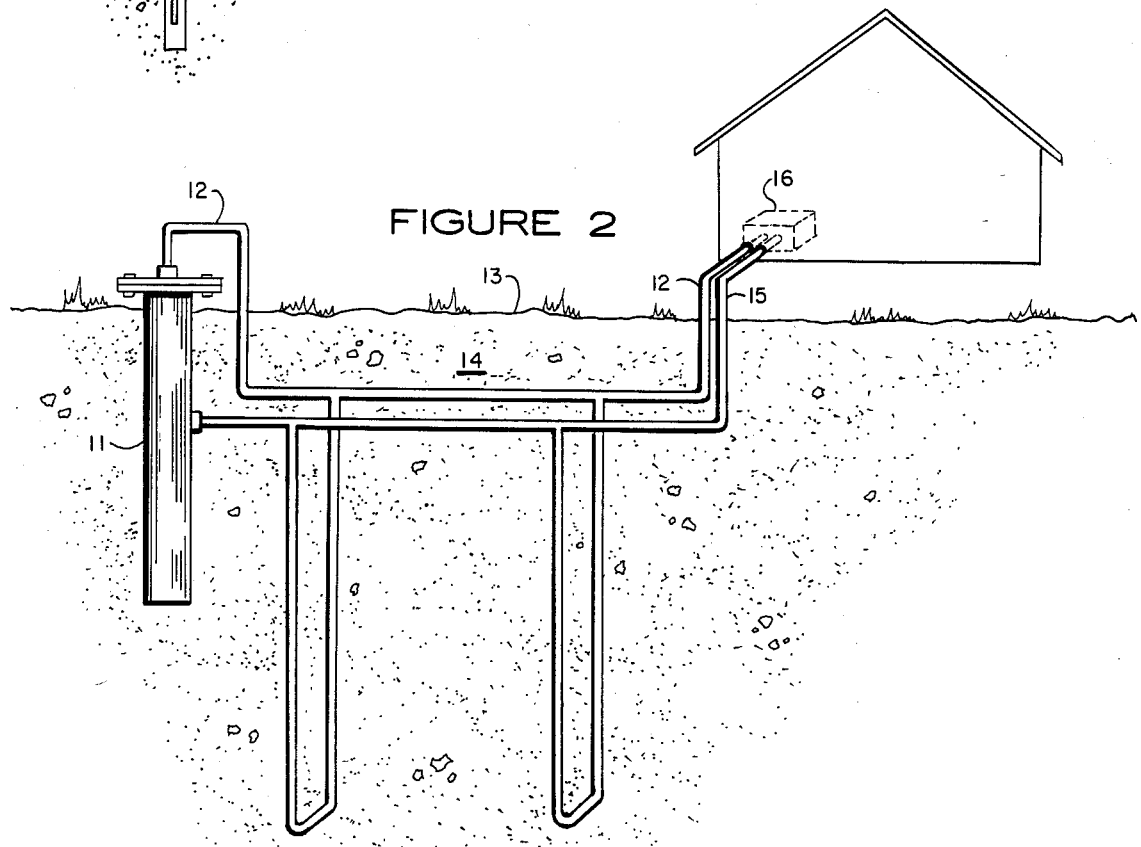
FIG. 2 is a schematic of a preferred embodiment of the invention.
Figure 3:
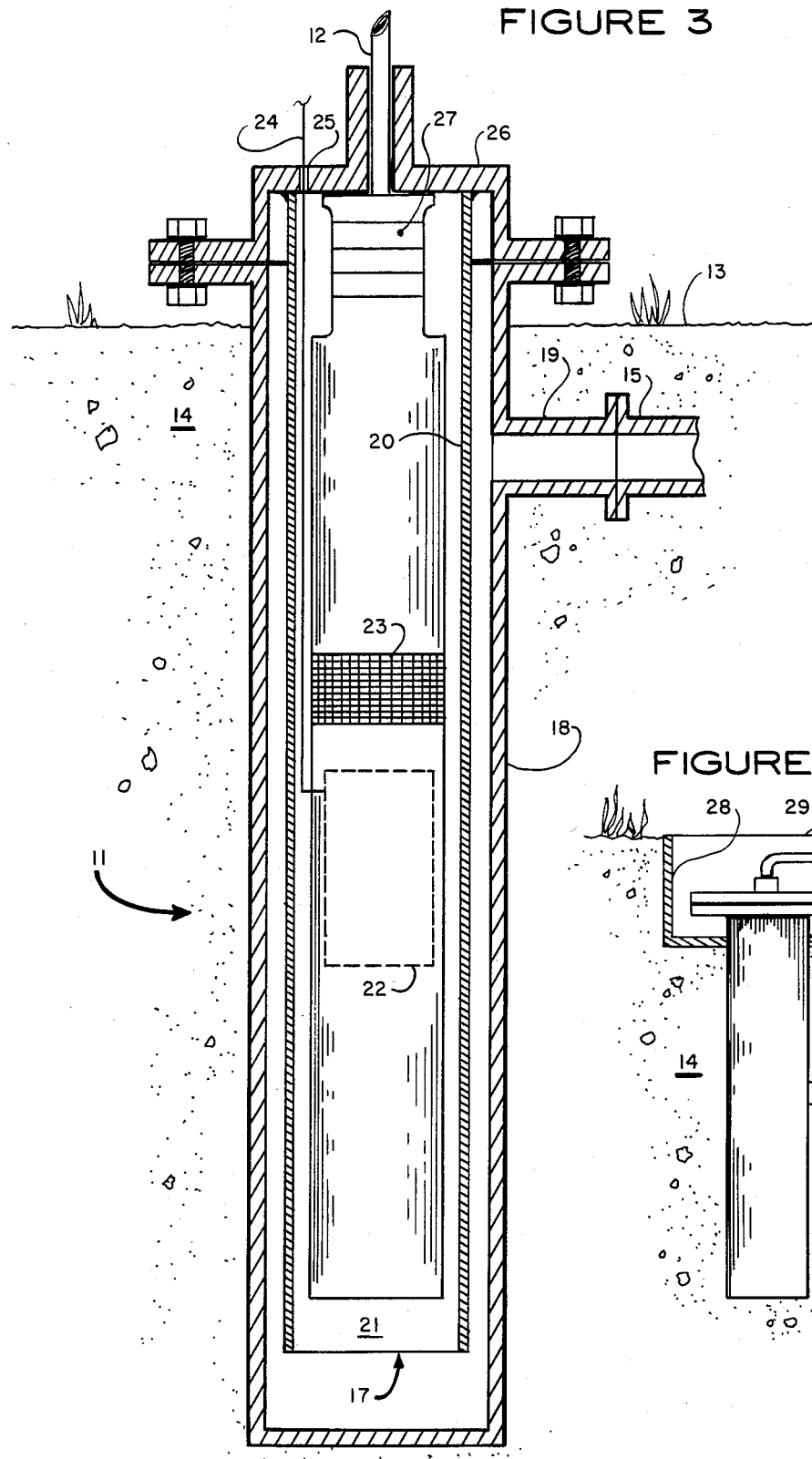
FIG. 3 is a cross-sectional view of a preferred embodiment of the sealed submersible pump assembly utilized in the invention.

However, applicant has now found that many of the problems and inefficiencies of such system can be overcome through the use of the submersible pump assembly shown in FIG. 3 when used in a closed loop system such as the one illustrated in FIG. 2.

The closed loop system comprises the sealed submersible pump assembly 11 to which is attached at one end first tubing 12 that is positioned below the surface 13 of the soil 14, at a depth whose temperature during the year is relatively constant. In most instances this will be at a depth of 2 or more feet. A second tubing 15 is attached at one end to the opposite operative end of assembly 11 and at its opposite end to a heat exchange means 16 such as the condensor of a conventional air conditioning unit. First tubing 12 is connected at its opposite end to the heat exchange means 16 to form a closed loop so that a fluid such as water, similar fluid or mixtures thereof can flow.

More preferably, assembly 11 comprises a conventional submersible pump 17, fixedly contained in sealable housing 18, having intake tubing coupling 19 wherein the fluid from tubing 15 enters housing 18, wherein in a preferred embodiment it strikes hollow cylinder 20 and flows downward and then upward in space 21 between cylinder 20 and submersible pump 17. In this embodiment, the water is kept turbulent and is forced to flow past motor 22 to insure motor 22 does not overheat. The water then enters the pump through filter screen 23 and is pumped into line 12 by conventional pump action. The fluid flows through pump 17 and out through discharge outlet 27 and into tubing 12. In this embodiment the refrigerant circuit in the heat exchange means 16 can be reversed depending whether one wishes to cool or heat the fluid.

Figure 4:
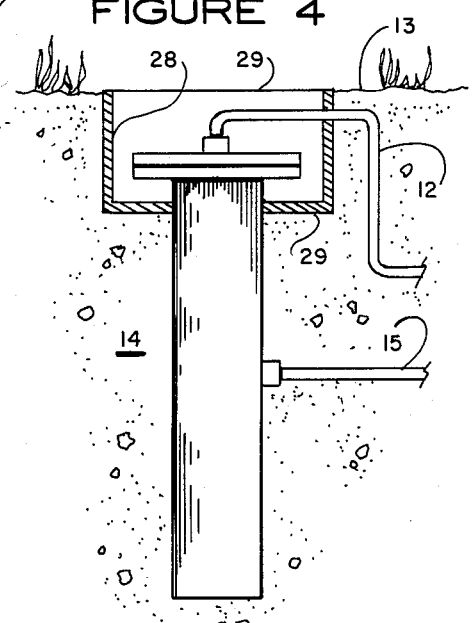
FIG. 4 is an alternate preferred embodiment wherein the pump assembly is positioned below ground level.

Motor 22 is powered by electrical line 24 which passes through sealable opening 25 positioned in housing head 26 and preferably located above ground level 13 in order to permit easy access for repair. In a more preferred embodiment as shown in FIG. 4 an access box 28 is positioned below ground level 13 and has an opening in its bottom section 29 to allow pump assembly 11 to pass through and into the soil 14. The access box 28 preferably is of sufficient depth to permit line 12 to be positioned below ground level 13 so that when box lid 29 pivotally attached to access box 28 as shown is lowered the entire pump assembly 11 is not visible. In this manner better insolation is achieved and in many geographical areas prevents damage due to freezing temperature. Also no obstacle is created to hinder mowing, etc.

Thus through the use of the submersible pump, one is able to position the pump out of the building to be heated or cooled, and to position it within the ground. In this manner substantial improvements in noise and heat exchange efficiency can be achieved. In addition, the preferred embodiment results for a given configuration either greater pumping capacity per horsepower of the motor 22 or achieving a given pumping capacity with less horsepower than present systems.

There are of course many alternate embodiments such as different heat exchange means not specifically disclosed but which are meant to be included within the scope of this invention as defined by the following claims.

What I claim is:

1. A closed loop energy exchange for circulating a fluid and utilizing the relative constant temperature of the earth's subsoil to heat or cool the fluid comprising:
    (a) a first length of tubing, a substantial portion of which is positioned at a predetermined depth in the earth's subsoil, said first length connected at one end to a heat exchange means and connected at its opposite end to the inlet connection of a sealable submersible pump assembly, said submersible pump assembly comprising, an enclosed housing, said housing having at least one side wall for receiving said inlet connection of said sealable submersible pump assembly, a submersible pump positioned in said enclosed housing, a hollow member fixedly attached to the enclosed housing and positioned between the submersible pump and the enclosed housing, wherein the inlet connection is positioned to create a turbulent flow of fluid through said housing and past a motor that drives said submersible pump; and (b) a second length of tubing connected at one end to the outlet connection of the sealable submersible pump assembly and its other end operatively connected to the heat exchange means to allow flow of fluid through the second length to the first length of tubing.

2. A system according to claim 1 wherein said system includes a top, said top detachable from said enclosed housing.

3. A closed loop energy exchange system according to claim 1 wherein a substantial portion of said first and second lengths of tubing are positioned at least two feet below the surface of the earth's surface.

* * * * *

UNITED STATES PATENT AND TRADEMARK OFFICE
CERTIFICATE OF CORRECTION

PATENT NO. : 4,741,389

DATED : May 3, 1988

INVENTOR(S) : James R. Smith

It is certified that error appears in the above-identified patent and that said Letters Patent is hereby corrected as shown below:

Column 3, line 13, delete "the" and add --an--.

Signed and Sealed this
Twenty-eighth Day of November 1989

*Attest:*

JEFFREY M. SAMUELS

*Attesting Officer*     *Acting Commissioner of Patents and Trademarks*